(12) United States Patent
Olcese

(10) Patent No.: US 9,683,788 B2
(45) Date of Patent: Jun. 20, 2017

(54) STEAM HEAT STORAGE SYSTEM

(71) Applicant: COMMISSARIAT A L'ENERGIE ATOMIQUE ET AUX ENE ALT, Paris (FR)

(72) Inventor: Marco Olcese, Aix les Bains (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 110 days.

(21) Appl. No.: 14/424,755

(22) PCT Filed: Aug. 27, 2013

(86) PCT No.: PCT/EP2013/067736
§ 371 (c)(1),
(2) Date: Feb. 27, 2015

(87) PCT Pub. No.: WO2014/033132
PCT Pub. Date: Mar. 6, 2014

(65) Prior Publication Data
US 2015/0219403 A1  Aug. 6, 2015

(30) Foreign Application Priority Data

Aug. 29, 2012 (FR) ..................................... 12 58070

(51) Int. Cl.
*F28D 20/02* (2006.01)
*F03G 6/00* (2006.01)
(Continued)

(52) U.S. Cl.
CPC ................ *F28D 20/02* (2013.01); *F01K 1/04* (2013.01); *F01K 1/08* (2013.01); *F01K 1/12* (2013.01);
(Continued)

(58) Field of Classification Search
CPC .......... F24J 2/34; F24J 2/345; F28D 20/0034; F28D 20/0039; F28D 20/02–20/028;
(Continued)

(56) References Cited

U.S. PATENT DOCUMENTS

| 1,294,714 | A | * | 2/1919 | Ruths | ........................ | F01K 1/00 |
| | | | | | | 122/35 |
| 1,581,229 | A | * | 4/1926 | Ruths | ........................ | F01K 3/14 |
| | | | | | | 60/659 |

(Continued)

FOREIGN PATENT DOCUMENTS

| DE | 41 21 460 | 1/1993 |
| DE | 10 2007 025 978 | 12/2008 |
| JP | 60 159377 | 8/1985 |

OTHER PUBLICATIONS

Laing, D., et al., "Thermal energy storage for direct steam generation", Solar Energy, 85 (2011), pp. 627-633.
(Continued)

*Primary Examiner* — Xiaoting Hu
(74) *Attorney, Agent, or Firm* — Oblon, McClelland, Maier & Neustadt, L.L.P.

(57) ABSTRACT

A solar plant including a solar field for production of steam, a turbine using steam, and an excess steam storage and draw off system. The system includes a latent heat thermal storage module and a liquid displacement thermal storage module including a liquid volume and a steam blanket. The modules are connected together so that the steam produced passes through the steam blanket before passing through the latent heat module, condensing, to be injected in the liquid volume, the lower part of the liquid volume being connected to the solar field and to an outlet of the turbine to let in or return cold liquid. The liquid volume acts as a liquid displacement reservoir.

18 Claims, 5 Drawing Sheets

(51) Int. Cl.

| | | |
|---|---|---|
| *F24J 2/34* | (2006.01) | |
| *F01K 1/08* | (2006.01) | |
| *F01K 3/00* | (2006.01) | |
| *F28D 20/00* | (2006.01) | |
| *F01K 1/12* | (2006.01) | |
| *F01K 1/04* | (2006.01) | |
| *F01K 3/12* | (2006.01) | |
| *F22B 1/00* | (2006.01) | |
| *F22B 1/02* | (2006.01) | |

(52) U.S. Cl.
CPC ............... *F01K 3/008* (2013.01); *F01K 3/12* (2013.01); *F03G 6/003* (2013.01); *F22B 1/006* (2013.01); *F22B 1/028* (2013.01); *F24J 2/34* (2013.01); *F28D 20/0039* (2013.01); *F28D 20/021* (2013.01); *Y02E 10/46* (2013.01)

(58) Field of Classification Search
CPC .... F01K 3/00; F01K 3/008; F01K 1/00–1/20; F01K 3/12; F01K 3/14; F01K 3/002; F01K 3/16; F01K 3/26; F01K 3/262; F01K 3/265; F22B 1/006; F22B 1/028; F22B 1/08; F22B 1/10
See application file for complete search history.

(56) References Cited

U.S. PATENT DOCUMENTS

| | | | | |
|---|---|---|---|---|
| 1,959,286 | A * | 5/1934 | Grebe .................... | C09K 5/063 122/33 |
| 3,977,197 | A * | 8/1976 | Brantley, Jr. ............. | F01K 3/00 165/10 |
| 4,104,883 | A * | 8/1978 | Naef ......................... | F01K 9/00 165/104.13 |
| 4,192,144 | A * | 3/1980 | Pierce ....................... | F01K 3/00 122/28 |
| 4,479,352 | A * | 10/1984 | Yamaoka .................. | F01K 3/00 60/652 |
| 4,508,101 | A * | 4/1985 | Carter ....................... | C09K 5/063 126/400 |
| 4,643,212 | A * | 2/1987 | Rothrock ............. | B65D 88/744 126/640 |
| 5,269,145 | A * | 12/1993 | Krause .................... | C09K 5/063 126/618 |
| 2008/0276616 | A1 | 11/2008 | Flynn et al. | |
| 2009/0178409 | A1* | 7/2009 | Shinnar ..................... | F01K 3/00 60/645 |
| 2010/0170243 | A1 | 7/2010 | Garbe et al. | |

OTHER PUBLICATIONS

Velraj, R., et al., "Heat Transfer Enhancement in a Latent Heat Storage System", Solar Energy, vol. 65, No. 3, (1999), pp. 171-180.

Steinmann, W-D., et al., "Latent Heat Storage for Solar Steam Systems", Journal of Solar Energy Engineering, vol. 130, (Feb. 2008), (Total 5 pages).

Liu, et al., "Review on storage materials and thermal performance enhancement techniques for high temperature phase change thermal storage systems", Renewable and Sustainable Energy Reviews 16 (2012), pp. 2118-2132.

French Preliminary Search Report Issued May 7, 2013 in French Patent Application No. 12 58070 Filed Aug. 29, 2012.

International Search Report Issued Oct. 9, 2013 in PCT/EP2013/067736 Filed Aug. 27, 2013.

\* cited by examiner

STEAM HEAT STORAGE SYSTEM

TECHNICAL FIELD AND PRIOR ART

This invention relates to a steam thermal storage system and particularly to a direct solar steam generation plant comprising at least one such storage system.

Focused solar thermal technology consists of using solar radiation to heat a fluid that acts directly or indirectly as a heat source in a thermodynamic cycle. Focusing makes it possible to reach more or less high temperatures and thus to benefit from more or less high thermodynamic conversion efficiencies.

If the operation of focused thermodynamic solar plants is to be attractive for the generation of electrical power, it is essential to have high temperature thermal storage systems designed to store excess heat energy and to make it available for example when the intensity of the sunshine reduces.

Consequently, it is required to manufacture thermal storage systems capable of:

- maintaining constant energy production during cloudy periods by minimising the number of turbine shut-downs and start ups,
- run the turbine at optimum speed for a longer time,
- reduce the capacity of the power transformation system, by sizing the turbine for a nominal power less than the peak power,
- partially decouple electricity generation from the energy resource.

The deployment of cylindrical-parabolic oil solar plants has made it possible to develop central thermal storage systems using molten salts.

These are indirect sensible thermal storage systems that are relatively simple in which excess energy that goes out of the solar field is transferred to a mix of molten salts stored in a "hot" reservoir.

Energy is subsequently restored to the oil by cooling salts that are then sent to a "cold" reservoir.

These systems comprise a primary oil circuit to which a focused solar flux is applied and a secondary circuit inside which water circulates. Heat exchangers are provided between the primary circuit and the secondary circuit. These exchangers cause losses of efficiency and also increase the cost of the solar plant.

Direct steam generation systems have been developed in order to improve performance and therefore reduce the cost of generating electricity.

To achieve this, the solar field generates steam for the thermal loop directly, eliminating losses of efficiency related to heat exchangers between the primary circuit and the secondary circuit and simultaneously directly generating superheated steam at temperatures higher than temperatures possible with the oil technology. Steam is used directly in the turbine(s). Excess steam is stored in a storage system.

In the case of a direct solar steam generation plant, the thermal storage system comprises three stages in series for questions of efficiency: a low temperature stage, a latent heat stage containing a phase change material and a high temperature stage in order to follow the water evaporation curve more closely.

In the storage phase, steam firstly enters the high temperature stage where it is desuperheated before it enters the latent heat stage where it is condensed and energy is stored in phase change materials, and the condensate formed through the latent heat module then passes through the low temperature stage that once again cools the condensate. Finally, the supercooled condensate exits from the low temperature stage and is reinjected into the return circuit to the solar field.

In the destorage phase, water in liquid form leaving the turbine is sent to the low temperature stage where it is heated by the stored heat and then passes through the latent heat module in which it is evaporated and then passes through the high temperature stage in which the water in the form of steam is superheated. It is finally transferred into the turbine to generate electricity.

Document D. Laing. (2011). *Thermal Energy Storage for Direct Steam Generation. Solar Energy*-85, 627-633 describes a direct steam generation thermal storage system. Thermal storage in the low temperature stage is stored by direct storage in concrete. However it has been found that this creates reliability problems and has a low efficiency.

Furthermore, thermal storage systems with direct steam generation according to the state of the art are more complex than oil storage systems. This is why their estimated cost is higher than it is for oil units, for large plants.

DESCRIPTION OF THE INVENTION

Consequently, one purpose of the invention is to disclose a steam thermal storage system that is simpler than systems according to the state of the art, with improved dependability and better efficiency.

The purpose mentioned above is achieved by a steam thermal energy storage system comprising a first latent heat thermal energy storage reservoir and a second liquid displacement thermal energy storage reservoir, the liquid displacement thermal energy storage reservoir comprising a top zone full of steam and a bottom zone full of liquid, the first and the second reservoirs being connected such that steam entering the first reservoir after condensation during the charge phase, supplies the second reservoir with hot liquid in the bottom part full of liquid, and during the discharge phase, the lower part full of liquid from the second reservoir supplies the first reservoir with hot liquid, and such that the liquid and steam mix produced by the first reservoir passes through the second reservoir before it is drawn off for use. The second reservoir comprises a connection in its lower part to enable drawing off of cold liquid from the system during the charge phase and to supply cold liquid to the storage system during the discharge phase.

In the application to a solar plant, the thermal storage system comprising the above system may also but does not necessarily comprise a high temperature module connected in series, steam produced by the solar field passing through the high temperature module to be cooled before entering the thermal storage system, and steam produced by the storage system as it is discharged passes through the high temperature module to be superheated before it is transferred into the turbine, for example to generate electricity.

In other words, in the application to a solar plant, the low temperature stage and the latent heat module are replaced by a system with two interconnected reservoirs, one being a latent heat thermal storage reservoir and the other being a direct liquid displacement storage reservoir, in which steam generated by the latent heat reservoir circulates in the liquid displacement reservoir before being transferred to the high temperature stage or then directly to the steam usage circuit if the plant does not include a high temperature stage.

This storage mode is very efficient.

Association of a latent heat thermal storage reservoir and a liquid displacement reservoir has the advantage of providing instantaneous compensation for relatively long transients during the main cycle, i.e. the steam production cycle for example by the solar field, and particularly fast solar power transients caused by clouds passing in front of the sun. As soon as the steam quantity generated by a solar field reduces and is less than that required for optimum operation of the turbine, the required steam quantity is taken out of storage by the thermal storage system. With the invention, the presence of a large quantity of hot liquid in the liquid displacement reservoir is sufficient to maintain steam production over a relatively long time interval without a large variation of the operating pressure, while steam production in thermal storage systems in solar plants according to the state of the art over a relatively long period is only possible if it is accompanied by pressure reductions of the order of 10 to 20 bars.

In one very advantageous embodiment, the connection between the primary circuit or the high temperature module (when there is a high temperature module) and the latent heat thermal storage module is made through the top part of the liquid displacement reservoir at the steam blanket. This example embodiment has the advantage that it is simple to manufacture because the number of connections is reduced, and therefore the manufacturing cost is also reduced. At the same time, it enables a pressure equilibrium between the two reservoirs which will be an advantage later for more efficient compensation of pressure drops in the primary circuit.

The purpose of this invention is then a steam thermal storage system comprising a latent heat thermal storage module and a liquid displacement thermal storage module, the liquid displacement thermal storage module comprising a reservoir that will contain a volume of liquid and steam in its upper part, said system comprising first means of transferring liquid between an upper zone in the liquid volume and the latent heat thermal storage module, second means of transferring liquid between a lower zone in the liquid volume and a first external circuit, third means for transferring steam or a liquid-steam mix between the upper part of the liquid displacement thermal storage module and the latent heat thermal storage module, and fourth means for transferring steam between the system and a second external circuit.

In one example embodiment, the fourth means for transferring steam between said system and an external circuit are formed by a connection opening up only in the upper part of the liquid displacement thermal storage module.

In another example embodiment, the fourth means of transferring steam between the system and an external circuit are formed by a steam supply connection opening up into the latent heat thermal storage module and a steam evacuation connection that draws off steam from the upper part of the liquid displacement thermal storage module. The third transfer means may comprise a first control valve to interrupt communication between said modules.

The latent heat thermal storage module for example comprises at least one phase change material and thermal storage means between said material and the fluid passing through the latent heat thermal storage module. As a variant, the latent heat thermal storage module may comprise at least one solid/solid state transition material and means of heat exchange between said material and the fluid passing through the latent heat thermal storage module.

Advantageously, the latent heat thermal storage module comprises a first reservoir containing said phase change material and/or said solid/solid state transition material, a second reservoir distinct from the first reservoir for the fluid flow and heat exchange means between the first reservoir and the second reservoir.

The first transfer means may comprise a hydraulic pump for transferring liquid from the latent heat thermal storage module to the liquid displacement thermal storage module.

Preferably, the height of the reservoir of the latent heat thermal storage module is less than or equal to the height of the liquid displacement thermal storage module reservoir.

The system may advantageously comprise a floating membrane separating a liquid zone at a first high temperature from a liquid zone at a second temperature, the first temperature being higher than the second temperature.

The first transfer means may preferably include a distributor to inject or draw off liquid in or from the liquid displacement thermal storage module so as to reduce turbulence in the liquid volume.

Another purpose of this invention is a direct steam generation solar plant comprising a main circuit including a solar field for the production of steam and a steam usage zone connected in series and a secondary circuit connected to the solar field so that it can be supplied by the solar field with at least a fraction of the steam flow and supply the solar field with liquid, said secondary circuit comprising a storage system according to the invention, the third transfer means being connected with the input to the solar field and with the output from the steam usage zone, and the fourth means connecting the thermal storage system with the outlet from the solar field.

In one example embodiment, the solar plant comprises a second control valve between the outlet from the solar field and the latent heat thermal storage module when the first control valve is in an open state or a closed state, the second valve is in a closed state or open state respectively.

The solar plant may comprise a high temperature sensible heat thermal storage module placed between the outlet from the solar field and the storage system.

The steam usage zone may for example be an electricity generation zone.

The third transfer means may comprise a hydraulic pump for transferring liquid from the liquid displacement storage module (14) to the solar field at a given pressure.

Advantageously, the high temperature thermal storage module and the thermal storage system are charged with thermal energy as long as the steam pressure produced by the solar field is greater than or equal to a given pressure and the thermal storage system produces steam automatically as soon as the steam pressure generated by the solar field is less than or equal to a given value. The given pressure may for example be the nominal operating pressure of a turbine in the steam usage zone.

BRIEF DESCRIPTION OF THE DRAWINGS

This invention will be better understood after reading the following description and the appended drawings in which.

DETAILED PRESENTATION OF PARTICULAR EMBODIMENTS

In the following description, the steam thermal storage system will be described in an application to a direct solar steam generation plant for which it is particularly suitable. But the storage system can be used to store and recover thermal energy in any type of installations requiring storage and recovery of steam.

Figure 1:
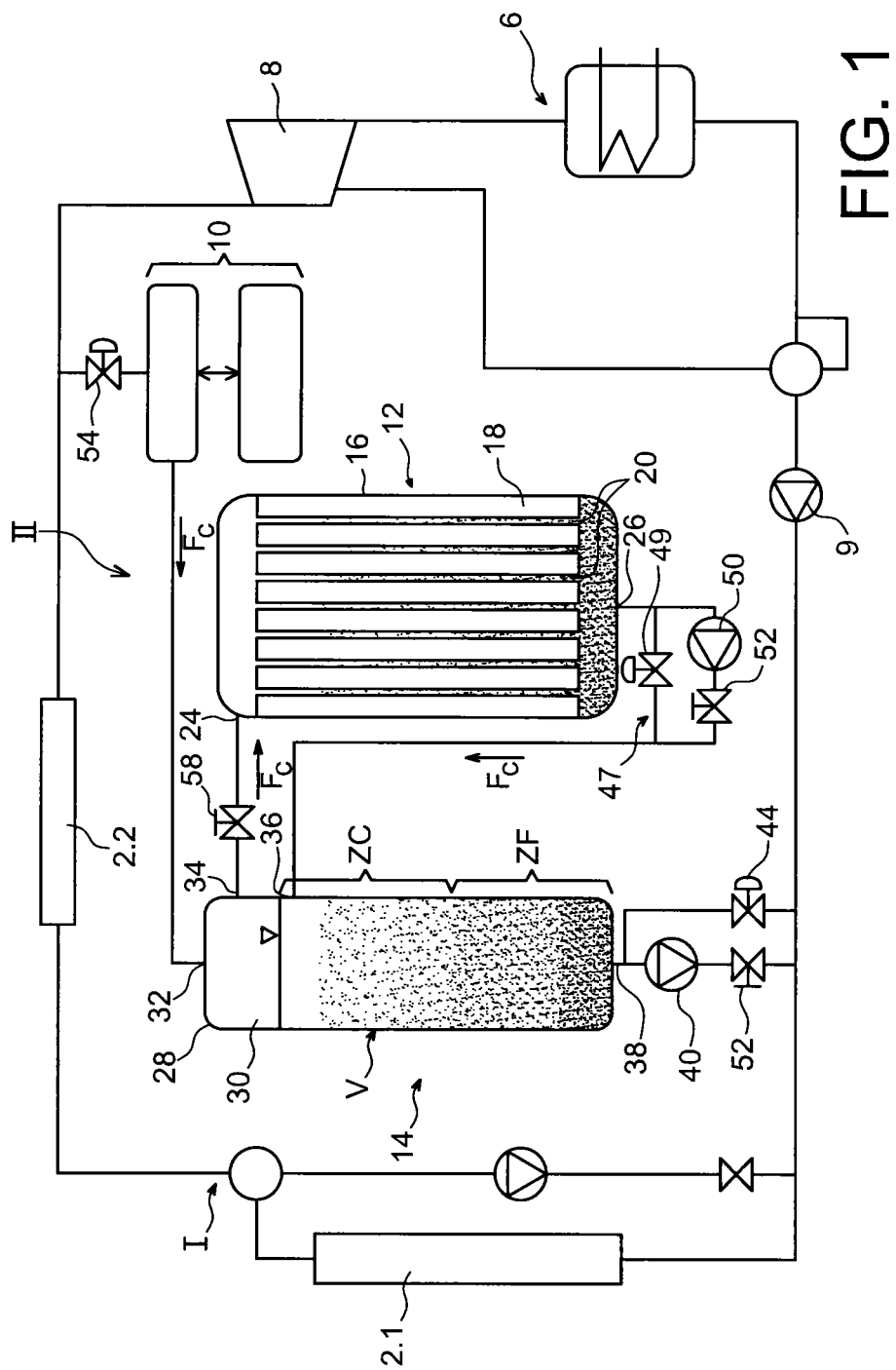
FIG. 1 is a diagrammatic view of a direct solar steam generation plant comprising a steam thermal storage system according to one embodiment in a storage configuration.
Figure 2:
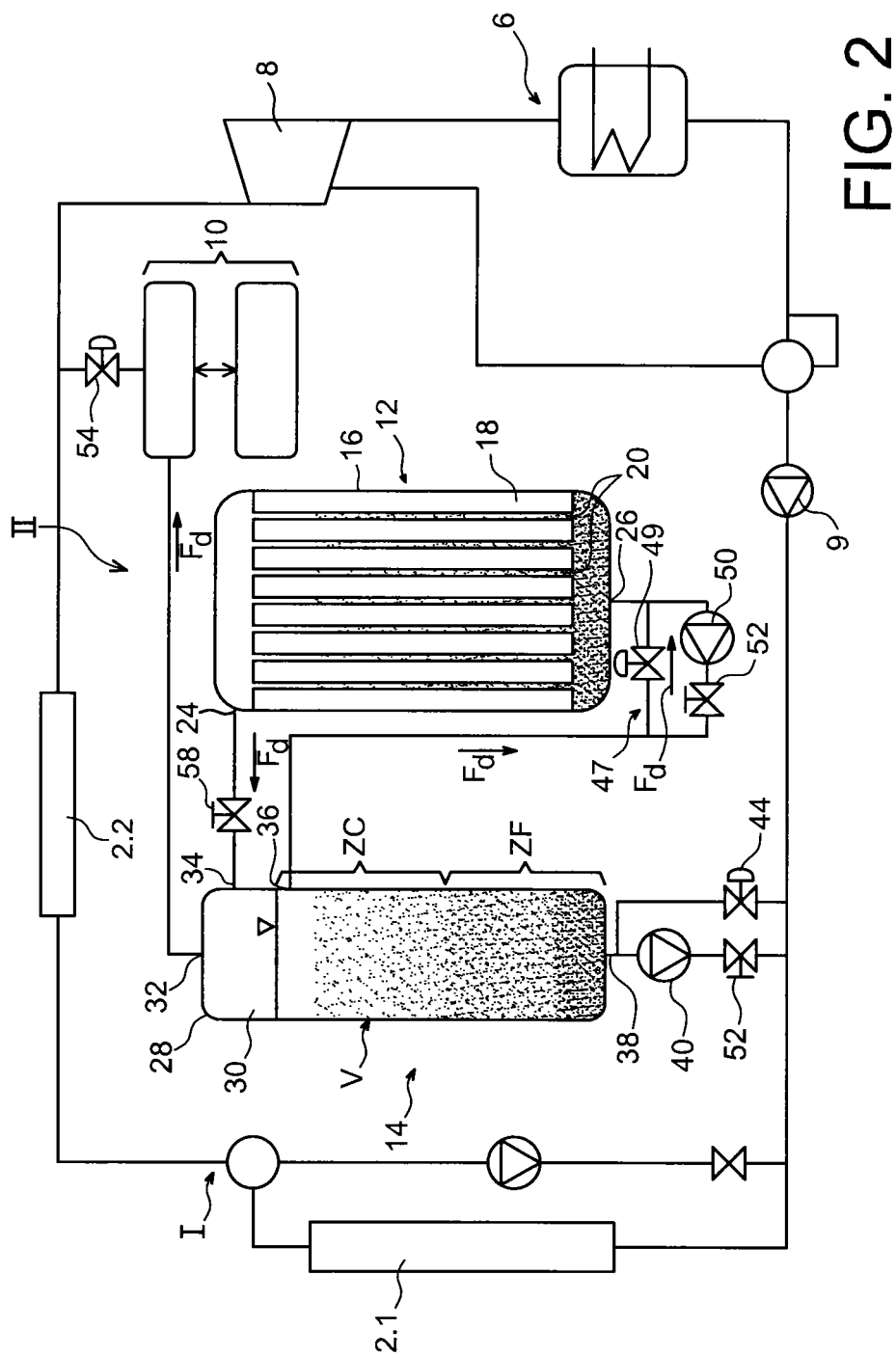
FIG. 2 is a diagrammatic view of the solar plant in FIG. 1 in a configuration for recovering heat energy stored in the thermal storage system.

FIGS. 1 and 2 show an example of a diagrammatic view of a solar direct steam generation plant S1 comprising one embodiment of a thermal storage system ST1. This system will be called a "storage system" for reasons of simplicity in the remainder of the description.

In the example, the solar plant S1 includes a main circuit I comprising a solar field, of which a part 2.1 forms an evaporation zone and a part 2.2 forms a superheating zone for the steam generated, and a steam usage zone, for example to generate electrical energy 6. A fluid circulates in the main circuit I that passes alternately from the liquid state to the vapour state and from the vapour state to the liquid state. The superheating zone is not necessarily present and the steam may be delivered to the application in the saturated state. Other arrangements of zones 2.1 and 2.2 are possible such as the configuration in which zones 2.1 and 2.2 are connected directly, thus eliminating recirculation. Thus, the thermal storage system may be used for configurations of direct steam generation solar plants different from those described in FIGS. 1 and 2.

The solar plant also comprises a secondary circuit II connected in parallel with the electrical energy generation zone 6. The example solar plant shown applies to a solar plant generating superheated steam, the secondary circuit II comprises a high temperature thermal storage module 10 and the steam storage system ST1.

The solar field may for example be of the cylindrical-parabolic type, the tower type, the Fresnel type or any other type of solar plant.

The outlet from the superheating zone 2.2 in the solar field 2 is connected to the electrical energy generation zone 6 and also to the secondary circuit II. The electricity generation zone 6 and the secondary circuit II are connected in parallel.

The outlet from the electrical energy generation zone 6 and the secondary circuit II are connected to the inlet to the solar field evaporation zone 2.1.

The electrical energy generation zone 6 comprises one or several turbines 8 and a circulation pump 9. Such a zone is well known to those skilled in the art, and will not be described in detail. Steam outlet from the solar field circulates in priority in the electrical energy generation zone 6, when there is a demand for it. When the steam flow exceeds the nominal turbine flow or when the electrical energy generation demand is lower, the excess steam flow is sent into the secondary circuit II.

We will now describe details of the secondary circuit II and the storage system ST1.

In the example shown, the secondary circuit II comprises a high temperature thermal storage module 10 and the storage system ST1 connected in series. A secondary circuit that does not have a high temperature thermal storage module is not outside the scope of this invention.

In the configuration shown, the high temperature module 10 is located downstream from the storage system ST1 considering the fluid circulation from the superheating zone 2.2 of the solar field to the storage system ST1.

The high temperature module 10 is for example an indirect thermal storage device comprising a heat exchanger with a secondary circuit comprising a molten salts storage reservoir or a solid air-matrix regenerator. As a variant, it may be a direct storage device in concrete or in any other material.

For example, the inlet temperature in the high temperature thermal storage module is between 300-600° C.

In the example shown, the storage system ST1 comprises a latent heat thermal storage module 12 subsequently denoted "latent heat module" and a liquid displacement thermal storage module 14, subsequently referred to as "liquid displacement module".

The latent heat module 12 comprises a reservoir 16 containing a phase change material 18 and channels 20 passing through the phase change material, while fluid circulates in the channels to exchange heat with the phase change material 20. The phase change material may be chosen from among phase change materials known for use in thermal storage. In particular, it may be chosen among materials described in the article by Murat M. Kenisarin (<<High-temperature phase change materials for thermal energy storage>>, Renewable and Sustainable Energy Reviews 14 (2010) 955-970). As a variant, the phase change material may be encapsulated and/or the latent heat module may comprise an exchanger that may be of the scraped surface type.

Furthermore, the latent heat module may contain one or more solid/solid state transition materials, instead of the phase change material and/or in addition to the phase change material. In the remainder of this description, we will use the example of a latent heat module with a phase change material.

The latent heat module 12 comprises a vapour supply or vapour draw off connector 24, subsequently referred to in this description as the "first vapour connector 24" and a liquid draw off or liquid supply connector 26, subsequently referred to as the "first liquid connector 26" in the remainder of this description. In the example shown, the first vapour connector 24 is located in the upper part and the first liquid connector 26 is located in the lower part of the reservoir 16, but this is not a limitative case, a reservoir arranged horizontally could be envisaged. Furthermore in the example shown, the reservoir 16 is in the form of a cylinder of revolution but this shape also is not limitative.

As a variant, the thermal storage could be done indirectly, i.e. the phase change material can be located in a reservoir separate from the reservoir in which the fluid is circulating and the heat exchange between the fluid and the phase change material takes place through a heat exchanger and a secondary circuit. This variant has the advantage that a compact reservoir designed to resist high pressure can be made because it does not contain a phase change material. The manufacturing cost can then be reduced.

A liquid displacement thermal storage module comprises a liquid volume V and a vapour blanket, the liquid volume V comprising an upper part ZC formed from a hot liquid, a lower part ZF formed from a cold liquid and a transition region separating the upper part and the lower part. The transition region is called "thermocline". There is no heat exchange inside the module. Furthermore, it does not contain any phase change material. Moreover, storage takes place by liquid displacement inside the reservoir while maintaining a constant volume.

The liquid displacement module 14 comprises a reservoir 28 containing a liquid volume V that represents a large portion of the internal volume of the reservoir 28 and an upper zone 30 filled with vapour and forming a vapour blanket. The ratio between the liquid volume V and the vapour blanket volume is preferably relatively high, of the order of 10 to 20 to minimise the total volume and therefore the cost of the reservoir. The liquid volume V comprises a hot liquid zone ZC in the upper part and a cold liquid zone ZF in the lower part. The zone ZF is in contact with the steam blanket 30. In the example shown, the reservoir 28 is in the form of a cylinder of revolution, the axis of which is along the vertical direction but this form is in no way limitative.

The reservoir 28 comprises a connector 32 located in the upper zone 30 of the reservoir 28 opening up in the vapour blanket 30 and that will be used to supply vapour or to draw off vapour, hereinafter referred to as the "second vapour connector", a connector 34 in the upper zone 30, connected to the first vapour connector 24 of the latent heat module 14, that will subsequently be referred to as the "third vapour connector", a connector 36 opening up into the hot liquid zone ZF and connected to the first liquid connector 26 of the latent heat module 12, hereinafter referred to as the "second liquid connector" and a connector 38 opening up in the bottom of the reservoir 28 in the cold liquid zone ZF, hereinafter referred to as the "third liquid connector". The third liquid connector 38 is connected through a return circuit to the supply circuit of the evaporation zone 2.1 of the solar field 2 through a hydraulic pump 40 and a control valve 42 that returns cold liquid to the solar field in the charge phase. The hydraulic pump 40 raises the pressure of the liquid to the solar field inlet pressure.

The third liquid connector 38 is also connected through a supply circuit to the outlet from the electrical energy generation zone 6, the circuit also comprising a regulation valve 44. This supply circuit can supply the reservoir 28 with cold liquid during the discharge phase.

The latent heat module 12 is connected through its first liquid connector 26 to the second liquid connector 36 of the reservoir 28 through a return circuit 48 through a second hydraulic pump 50 and a stop valve 52, to circulate liquid from the latent heat module 12 to the liquid displacement module 14. The latent heat module 12 is also connected through its first liquid connector 26 to the second liquid connector 36 of the liquid displacement reservoir through a supply circuit 47 fitted with a regulation valve 49 to maintain supply to the latent heat module 12 during the discharge phase.

Preferably, the reservoir 16 of the latent heat module 12 is the same height or is less than the height of the reservoir 28 of the liquid displacement module so that the discharge phase can take place in natural circulation. Thus, the cost related to installation and maintenance of a hydraulic pump is avoided. A system in which there is forced circulation of liquid between the two reservoirs during the discharge phase is not outside the scope of this invention.

Advantageously, the liquid displacement reservoir has a sufficiently large length/diameter ratio to reduce the cost of the material related to high pressure construction and reduction of heat loss while taking account of its installation. The ratio is necessarily greater than 1, and is advantageously between 3 and 15 and more particularly of the order of 10.

In the example shown, there is a regulation valve 54 at the inlet to the secondary circuit II. This regulation valve 54 may advantageously be omitted. The steam supply to the secondary circuit II only takes place when there is excess steam, therefore the valve 54 may be omitted. Furthermore, due to the connection between the high temperature module and the latent heat module through the liquid displacement module, there is a pressure balance between reservoirs 16 and 28, which means that regulation valves do not have to be used.

It will be understood that the location of connectors through reservoirs 16 and 28 is not limitative. This is the location of the fluid supply or return that has to be considered. For example, as will be described later in FIG. 6, the connection between two reservoirs can take place in one part of the reservoir and the fluid injection can take place in another zone inside the reservoir.

Operation of the thermal storage system ST1 will now be described. We will consider that the secondary circuit II does not include the regulation valve 54.

We will firstly disclose a thermal energy storage phase and will then disclose a phase in which this thermal energy is removed from storage.

Throughout the day, when steam flow originating from the solar field exceeds the demand flow from the turbine, the excess flow is sent to the secondary circuit II to store excess thermal energy. Fluid circulation takes place along arrows Fc.

Fluid in steam form firstly passes through the high temperature module 10 in which the steam temperature is reduced by heat exchange, but the fluid is still in steam form. Part of the energy is stored in the high temperature module 10 in the form of sensible heat.

The steam then enters the liquid displacement module 14 at the steam blanket 30 through the second steam connector 32 with a given degree of superheating. When the solar plant does not contain a steam superheating zone, the steam is in saturation condition. Depending on temperature conditions in the steam blanket 30, the entering steam can condense partially until equilibrium conditions are reached, i.e. saturation. The condensate leads to a saturated water layer that remains stable on the surface of the liquid water volume on the hot liquid zone ZC.

The non-condensed part of the fluid flow under steam enters the latent heat module 12 through the first steam connector 24 and circulates through the phase change material in which it loses heat and condenses. Fluid in liquid form flows by gravity towards the lower end of the reservoir 16 of the latent heat module 12 to the first liquid connector 26 and is collected in the lower end of the reservoir 16. The hydraulic pump 50 is then activated and the control valve opens in the return circuit for transferring fluid in liquid form to the second liquid connector 36 in the reservoir 28 of the liquid displacement module. The liquid fluid is injected into the hot liquid zone ZC and remains in equilibrium due to the difference in density relative to the colder liquid in the lower part of the reservoir 28. During the charge phase, the pressure in the main circuit is such that it is higher than the saturation pressure corresponding to the phase change temperature of the phase change material in order to set up a positive temperature gradient between the fluid and the phase change material and thus transfer heat from the steam fluid to the phase change material. The phase change material has melted due to heat exchanges with steam and stores thermal energy in the form of latent energy.

Thus, part of the thermal energy is stored in the latent heat module 12 in the form of latent heat and another part is stored in the liquid displacement module 14 in the form of sensible heat.

At the same time as the reservoir 28 is supplied with hot liquid fluid through the second liquid collector 36, cold liquid fluid is returned through the bottom of the reservoir 28 through the third liquid connector 38 and the return circuit to the solar field. The flow of returned cold liquid fluid is adjusted so as to keep the liquid level in the reservoir 28 constant. The difference between the mass flow of liquid fluid at the inlet to and outlet from said reservoir 28 due to the different densities is compensated for example at the feed water tank or the degasser in the low pressure part of the system. These elements are located at the electrical energy generation zone 6.

The liquid volume V of the liquid displacement module is also referred to as thermocline, in the field of solar thermal plants. There is a thermal stratification in the liquid volume V, the hot liquid located in the upper part ZC and the cold liquid located in the lower part ZF are separated by a transition region called "thermocline". During the charge phase, the thermocline moves towards the lower end of the reservoir 28.

During the charge phase, the temperature of the cold liquid fluid outlet through the third liquid connector is approximately constant, which minimises disturbances on the operating conditions of the main circuit of the system.

We will now describe a phase in which thermal energy is removed from storage. Fluid then circulates along the direction of the arrows Fd.

This removal from storage phase can take place when there is no sunshine, for example at night or during the day during cloudy periods or when steam flow generated by the solar field is no longer sufficient to achieve the flow necessary for the turbine.

Very advantageously, the storage system ST1 may be put into a condition in which it restores the stored energy at any time, and very quickly. As mentioned above, as soon as the steam pressure in the main circuit reduces, corresponding to an insufficient steam flow to supply the turbine at its nominal flow, the storage system ST1 begins to generate steam.

In a first phase, due to the pressure drop, the steam generated is produced by a saturated steam flash of the liquid displacement module 14. This steam is therefore generated very quickly. This production of steam by the liquid displacement module 14 immediately that the pressure drops smoothes the changeover between a charge phase and a discharge phase. On the contrary, in systems according to the state of the art, steam is produced almost exclusively by the latent heat stage, the steam flash of the small water volume present in the latent heat module not playing a significant role in compensation of the steam flow drop, and sufficient steam generation only begins when the pressure drops by the order of 10 to 20 bars. On the other hand, according to this invention and due to the production of steam by steam flash in the liquid displacement module, steam is produced so as to compensate for the reduction of flow over a significant time interval as soon as the pressure drop is of the order of 1 to 2 bars.

In a second phase, when the pressure in the main circuit and also in the secondary circuit II has sufficiently dropped, steam begins to be produced by the latent heat module 12. To achieve this, the hot liquid fluid that is at a temperature close to saturation located in zone ZC of the sensible heat module circulates from the second liquid connector 36 to the first liquid connector 26 through the supply circuit. The hot liquid fluid circulates through the phase change material which causes its evaporation. The hot liquid fluid flow from the sensible heat module 14 is adapted to the steam flow produced in the latent heat module so that boiling can spread over the entire height of the latent heat module 12.

A water-steam mix is thus produced in the latent heat module. This two-phase mix is transferred into the upper part 30 of the liquid displacement module, i.e. in the steam blanket, through the first steam connector 24 and the third steam connector 34. The top part 30 of the liquid displacement module then very advantageously forms a separator: the liquid phase joints the hot liquid zone ZC and saturated steam leaves the liquid displacement module 14 through the second steam connector 32, passes through the high temperature module 10 in which it is superheated by energy stored in this module and is then sent to the turbine.

Due to the structure of the storage system according to the invention, the liquid-vapour separator is directly built into the system and therefore does not require any additional elements and connections.

At the same time as the hot liquid fluid is transferred from the liquid displacement module to the latent heat module, the liquid displacement module is supplied with cold liquid fluid through the third liquid connector 38 and the supply circuit connected to the outlet from the electrical energy generation zone 6. The incoming flow is adapted so that the level in the reservoir 28 remains approximately constant. In this phase, the separation front namely the "thermocline" between the hot part ZC and the cold part ZF of the liquid fluid in the reservoir 28 moves towards the top of the reservoir.

The liquid displacement module also performs a buffer function, for example in the case of cloudy periods. The steam pressure in the main circuit drops suddenly when there is a power demand from the turbine. Due to the capacity of the liquid displacement module to produce steam very quickly without making use of the latent heat module, the effect of transient situations for example such as cloudy periods on steam production can be smoothed out. This increases the life of the turbine.

Figure 3:
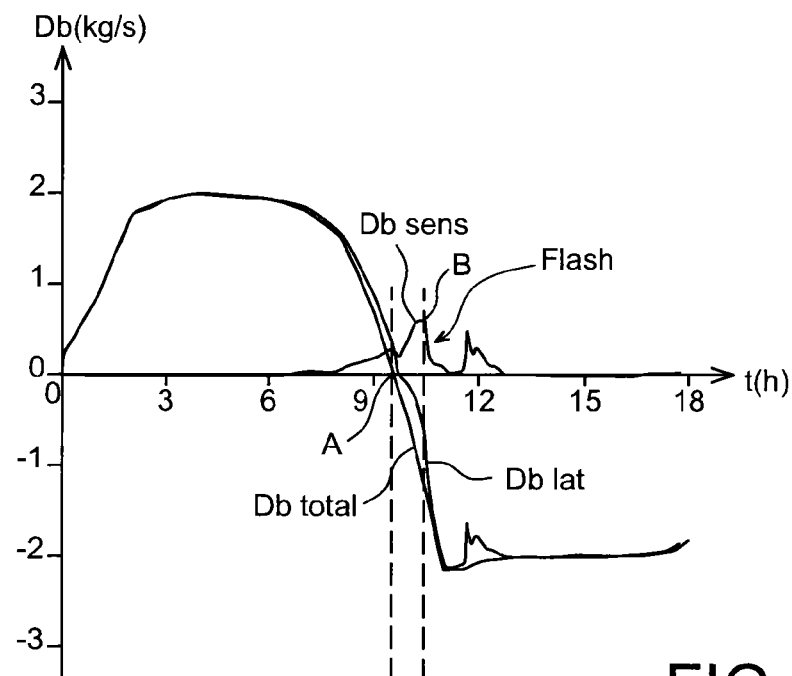
FIG. 3 is a graphic view of the variation of the total steam flow output from the storage system in FIGS. 1 and 2.

FIG. 3 also graphically shows the variation in the total steam flow in kg/s originating from the storage system ST denoted Dbtotal as a function of the time t in hours, the variation in the steam flow originating from the liquid flash in the liquid displacement module denoted Dbsens and the variation in the steam flow originating from the latent heat module denoted Dblat. The total flow is equal to the sum of the flash steam flow and the steam flow from the latent heat module.

It is found that for several tens of minutes during the beginning of a discharge phase, most of the steam flow is formed by the steam flash in the sensible heat module (the "Flash" zone). As explained above, this flash provides a smoothing effect between the charge phase and the discharge phase.

Figure 4:
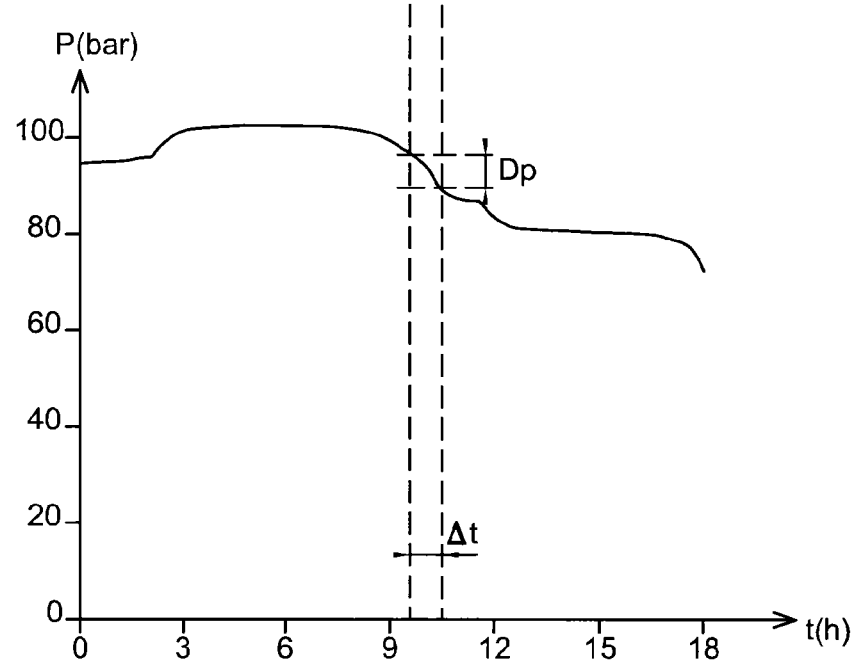
FIG. 4 is a graphic view of the variation in the pressure of the storage system in FIGS. 1 and 2 for one day.

FIG. 4 shows the variation in the pressure P in bars in the storage system as a function of the time y in hours. It can be seen that the steam flash smoothing function can limit the pressure variation Dp to 3-4 bars during a period $\Delta t$ equal to about half an hour between the end of steam production in the solar field (point A in FIG. 3) and the maximum flow (point B in FIG. 3) restored by the liquid flash in the liquid displacement module.

Figure 5:
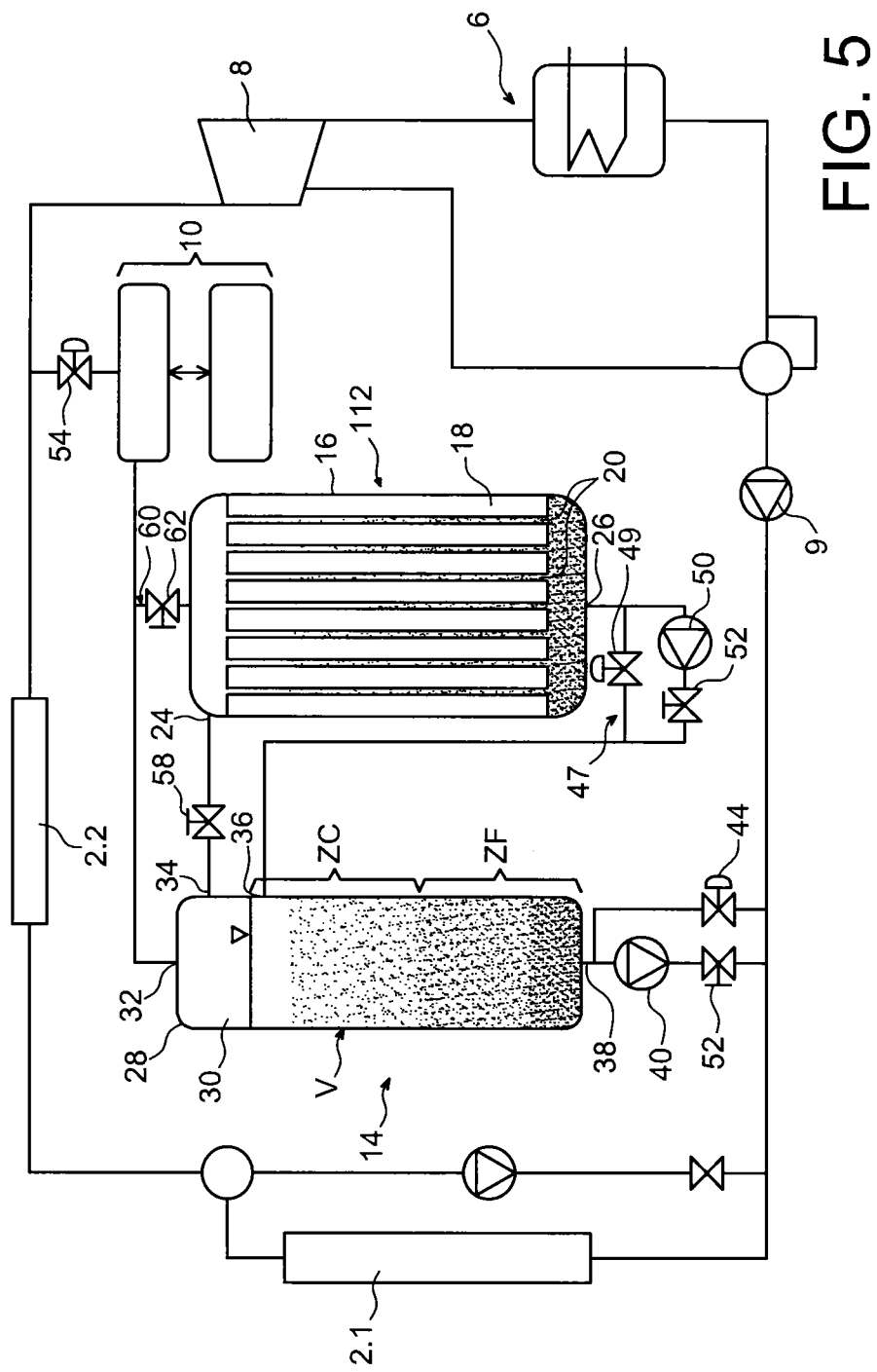
FIG. 5 is a diagrammatic view of a solar plant comprising a thermal storage system with direct steam generation according to another embodiment.

FIG. 5 shows another example embodiment of a storage system ST2. Elements with the same function and a similar structure will be denoted with the same references as those that were used to describe system ST1.

In this example embodiment, the latent heat module comprises a second steam connector 60 located in its upper part and directly connected to the latent heat module 112 through a control valve 62, the control valve 56 is located between the connection between the high temperature module 10 and the liquid displacement module 12.

In this example, the liquid displacement module 14 and the latent heat module 112 at not at the same pressure.

During the charge phase, the valves 56 and 58 are closed and the valve 62 is open, steam originating from the solar field through the high temperature module 10 enters directly into the latent heat module 112 to exit in the liquid phase through the first liquid connector 26 and is then sent into the zone ZC of the liquid displacement module 14.

During the discharge phase, valves 56 and 58 are open and the valve 62 is closed, operation is then the same as for the system in FIGS. 1 and 2. In this example embodiment, during cloudy periods, the small quantity of liquid inside the latent heat module will flash first to generate steam before the valves 56, 58 and 62 are switched to recovery from storage mode.

The behaviour of the liquid displacement module 14, and particularly the liquid volume V, is stable under all operating conditions, therefore it can operate without insert.

Advantageously, a separation diaphragm can be located between the holt part ZC and the cold part ZF of the liquid volume to reduce convection losses.

Very advantageously, the liquid displacement module comprises means of injecting liquid into the sensible heat module and the liquid-steam mix originating from the latent heat module, and also return of the liquid, preventing the appearance of any turbulence in the liquid volume V so that it remains under quasi-stationary conditions, except for the global displacement that normally takes place at very low speeds to prevent a mix between zone ZC and zone ZF. For example, these means include devices guaranteeing good distribution of fluid flow in the liquid displacement module 14.

Figure 6:
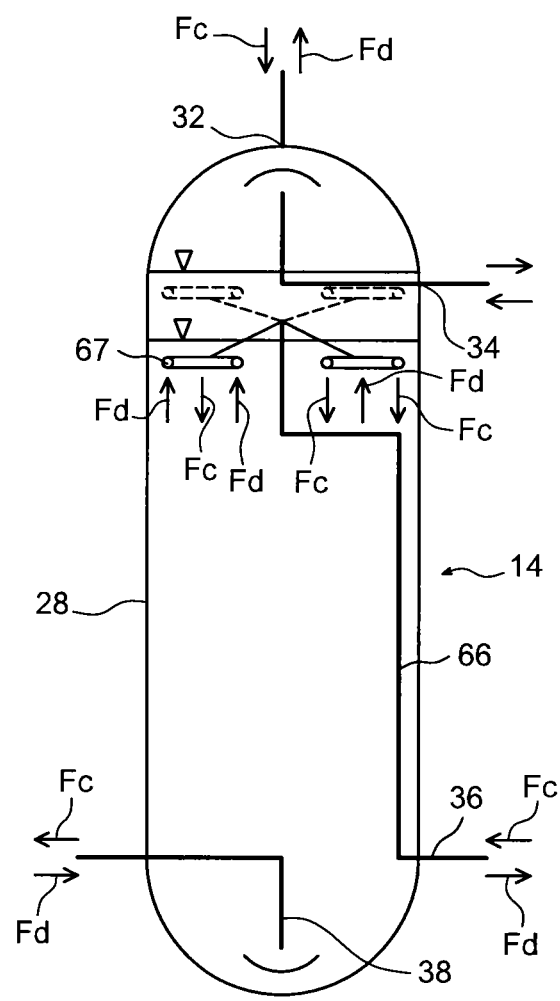
FIG. 6 is a diagrammatic view of the inside of a liquid displacement reservoir according to one example embodiment, particularly suitable for use in the storage systems in FIGS. 1, 2 and 5.

FIG. 6 diagrammatically shows a liquid displacement module with example embodiments of liquid and steam connectors in the liquid displacement module 14.

The third steam connector 34 passes laterally through the reservoir 28 and is bent so that it injects or draws off steam in the upper part of the steam blanket 30.

The second liquid connector 36 passes through the reservoir 28 in its lower part and is connected to a conduit 66 located inside the reservoir 28 that opens up in the upper part of zone ZC just below the interface with the steam blanket to distribute hot liquid for example through distributors 67. Advantageously, the distributors are configured to float on the surface of the volume V at the interface with the steam blanket and the distribution of hot liquid always takes place at the steam-liquid interface in the hottest part of the zone ZC and prevents the creation of turbulence due to natural convection currents.

The third liquid connector 38 does not pass through the bottom of the reservoir 28 directly, but rather passes through its sidewall and it comprises a bent conduit 68 that draws off or injects cold liquid into the bottom of reservoir 28.

The fluid used in the plant and that can vaporise and condense may for example be water. Organic fluids such as a silicone oil could also be used, for example pentafluoropropane known under the name R245fa or liquid metals, in particular with a low boiling point (for example less than 600° C.).

The invention is applicable to all processes involving fluids for which there is a liquid-vapour phase change and also to all phase change materials, that have a phase change temperature within the phase change temperature range of the fluid used in the process. Furthermore as already mentioned above, the phase change material can be replaced by or associated with a state change material with a solid/solid state change.

With the invention and more particularly the use of a latent heat reservoir and a liquid displacement reservoir, direct energy storage becomes possible to maximise the efficiency.

Furthermore, the storage system is easy to manufacture and its cost price is lower than systems with an indirect low temperature storage module for example with molten salts or oil.

The liquid displacement module also performs the buffer function that smoothes transient states such as cloudy periods lasting for several tens of minutes. In systems based on the state of the art, an additional buffer reservoir is provided to reduce these transients.

The sensible heat module can also smooth a transient pressure between the charge phase and the discharge phase because it generates steam quickly. This smoothing improves the efficiency at which energy is restored.

The thermal storage system can also be used in installations other than a solar plant, particularly for processes for which it is required to decouple steam production from its use or to smooth production, for example for waste incineration systems.

The invention claimed is:

1. A steam thermal storage system comprising:
a latent heat thermal storage module and a liquid displacement thermal storage module, the latent heat thermal storage module comprising a reservoir, the liquid displacement thermal storage module comprising a reservoir different from the reservoir in the latent heat thermal storage module, the reservoir of the liquid displacement thermal storage module containing a volume of liquid in a lower part and steam in an upper part, the liquid volume including an upper zone and a lower zone placed below the upper zone;
a first connector for transferring liquid between the upper zone in the liquid volume and the latent heat thermal storage module;
a second connector for transferring liquid between the lower zone in the liquid volume and an external circuit;
a third connector for transferring steam or a liquid-steam mix between the upper part of the reservoir in the liquid displacement thermal storage module and the latent heat thermal storage module; and
a fourth connector for transferring steam between the system and the external circuit, wherein the fourth connector comprises a connection opening up in the upper part of the liquid displacement thermal storage module configured to transfer the steam between the system and the external circuit.

2. A thermal storage system according to claim 1, wherein the fourth connector further comprises a steam supply connection opening up into the latent heat thermal storage module.

3. A thermal storage system according to claim 2, wherein the third connector comprises a first control valve to interrupt communication between the latent heat thermal storage module and the liquid displacement thermal storage module.

4. A thermal storage system according to claim 1, wherein the latent heat thermal storage module comprises at least one solid/solid state transition material or at least one phase change material and a heat exchanger between the solid/solid state transition material or the phase change material and the fluid passing through the latent heat thermal storage module.

5. A thermal storage system according to claim 4, wherein the latent heat thermal storage module comprises a first reservoir containing the phase change material or the solid/solid state transition material and a second reservoir distinct from the first reservoir for the fluid flow, wherein the heat exchanger is provided between the first reservoir and the second reservoir.

6. A thermal storage system according to claim 1, wherein the first connector comprises a hydraulic pump for transferring liquid from the latent heat thermal storage module to the liquid displacement thermal storage module.

7. A thermal storage system according to claim 1, wherein the height of the reservoir of the latent heat thermal storage module is less than or equal to the height of the reservoir in the liquid displacement thermal storage module.

8. A thermal storage system according to claim 1, further comprising a floating membrane separating a liquid zone at a first high temperature from a liquid zone at a second temperature, the first temperature being higher than the second temperature.

9. A thermal storage system according to claim 1, wherein the first connector comprises a distributor to inject or draw off liquid in or from the liquid displacement thermal storage module to reduce turbulence in the liquid volume.

10. A thermal storage system according to claim 1, wherein the upper zone of the liquid volume is separated from the lower zone by a thermocline.

11. A direct steam generation solar plant comprising:
a main circuit including a solar field for production of steam and an electricity generator configured to generate electricity from the steam, the electricity generator being connected in series with the solar field; and
a secondary circuit connected to the solar field so that the secondary circuit is supplied by the solar field with at least a fraction of the steam flow and supplies the solar field with liquid,
the secondary circuit comprising the steam thermal storage system according to claim 1,
the second connector being connected with an input to the solar field and with an output of the electricity generator and the fourth connector connecting the thermal storage system with an outlet of the solar field, and
the main circuit comprising the external circuit.

12. A solar plant according to claim 11, wherein:
the third connector comprises a first control valve to interrupt communication between the latent heat thermal storage module and the liquid displacement thermal storage module,
the solar plant comprises a second control valve between the outlet of the solar field and the latent heat thermal storage module, and
when the first control valve is in an open state or a closed state, the second valve is in a closed state or open state respectively.

13. A solar plant according to claim 11, further comprising a high temperature sensible heat thermal storage module placed between the outlet of the solar field and the steam thermal storage system.

14. A solar plant according to claim 11, wherein the electricity generator includes at least one turbine.

15. A solar plant according to claim 11, wherein the second connector comprises a hydraulic pump for transferring liquid from the liquid displacement storage module to the solar field at a given pressure.

16. A solar plant according to claim 11, further comprising a high temperature sensible heat thermal storage module placed between the outlet of the solar field and the storage system and in which the high temperature thermal storage module and the thermal storage system are charged with thermal energy as long as the steam pressure produced by the solar field is greater than or equal to a given pressure, and in which the thermal storage system produces steam automatically as soon as the steam pressure generated by the solar field is less than or equal to the given pressure.

17. A solar plant according to claim 16, wherein the electricity generator includes a turbine and the given pressure is a nominal operating pressure of the turbine.

18. A solar plant according to claim 11, wherein the upper zone of the liquid volume is separated from the lower zone by a thermocline.

* * * * *